United States Patent Office 2,824,746
Patented Feb. 25, 1958

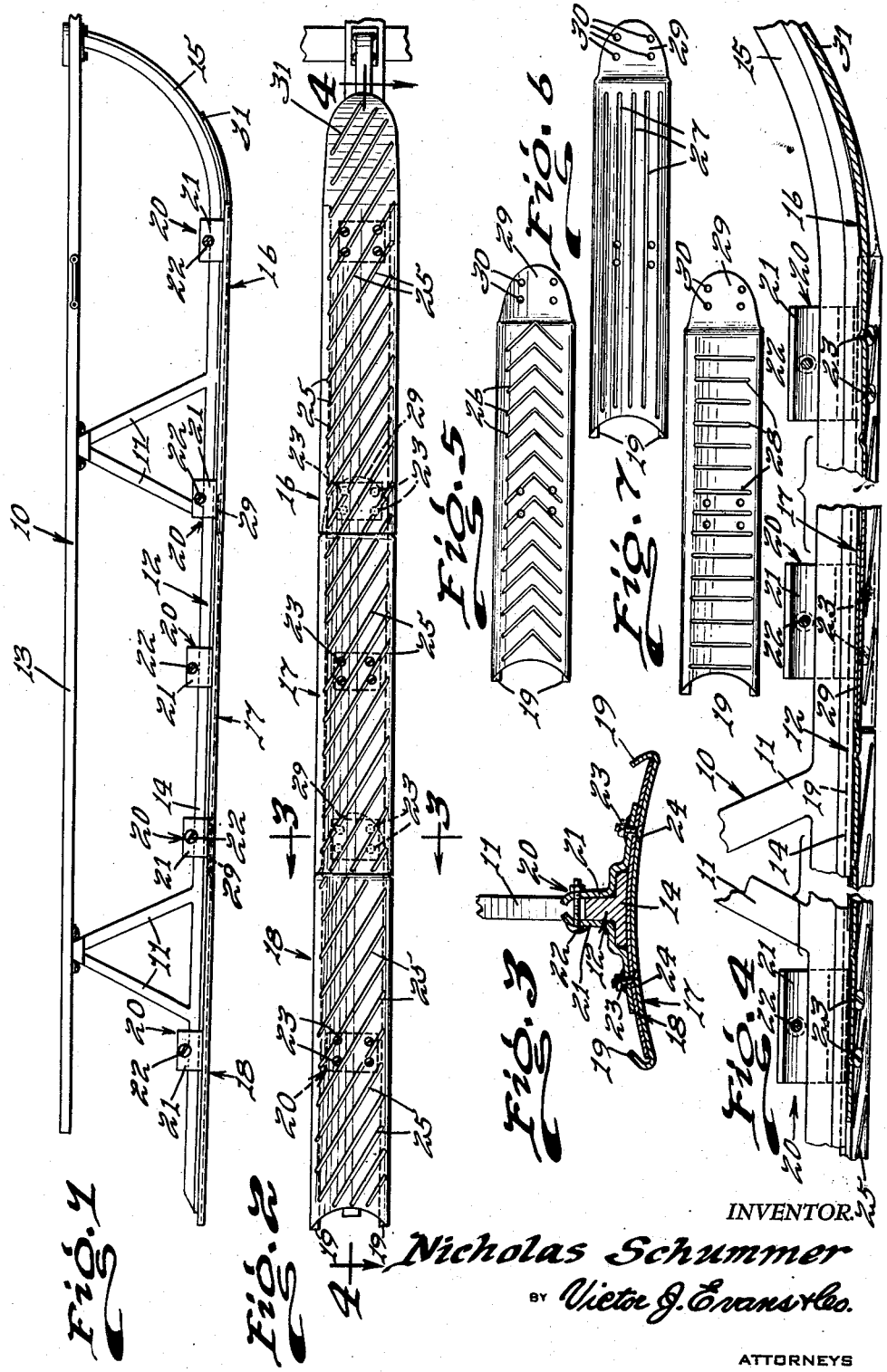

2,824,746

SLED SKI

Nicholas Schummer, Trumbauersville, Pa.

Application May 3, 1955, Serial No. 505,663

1 Claim. (Cl. 280—28)

This invention relates to a sled, and more particularly to skis for a sled.

The object of the invention is to provide skis which are adapted to be detachably connected to a sled whereby the skis can be used on the sled when it is desired to increase the contact surface of the sled in snow.

Another object of the invention is to provide skis for attachment to the runners of a conventional sled or sleigh so that the sled can be used in soft or shallow snow since the skis provide increased bearing surface for the sled.

A further object of the invention is to provide sled skis which are extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the sled, with the skis of the present invention attached thereto.

Figure 2 is a fragmentary bottom plan view showing the skis attached to the sled runner.

Figure 3 is a sectional view taken on the line 3—3 of Figure 2.

Figure 4 is a sectional view taken on the line 4—4 of Figure 2.

Figure 5 is a bottom plan view of one of the sections of the ski showing a modified arrangement of reinforcing ribs.

Figure 6 is a view similar to Figure 5, but showing a further modification.

Figure 7 is a view similar to Figures 5 and 6, but showing a still further modification.

Referring in detail to the drawings, the numeral 10 designates a conventional sled which includes a base or support portion 13, and depending from the base 13 are a plurality of braces 11 which are secured to the usual pair of runners 12. Each of the runners 12 includes a major straight portion 14 and a front curved portion 15, and the runners 12 have a T-shape in cross section, Figures 3 and 4.

The present invention is directed to skis which are adapted to be detachably connected to the runners 12 so as to permit use of the sled in soft or shallow snow since the skis provide a greater bearing or contact surface. Each of the skis comprises a plurality of sections such as the front section 16, intermediate section 17 and rear section 18. The side edges of the sections 16, 17 and 18 are curved to provide flanges 19, Figure 3, whereby the sides or edges of the sections will not dig into the snow.

A clamping means 20 is provided for detachably connecting the sections to the runners 12, and the clamping means 20 comprises fingers 21 which are arranged in pairs in opposed relation with respect to each other. Securing elements such as the securing elements 22 are provided for connecting the fingers 21 together, and the securing elements 22 may be bolt and nut assemblies as shown in Figure 3. The fingers 21 are secured to the sections by securing elements 23 which have their heads seated in recessed portions 24 in the sections so that the lower ends of the securing elements 23 will not protrude down and dig into the snow as the sled moves along the snow.

The sections 16, 17 and 18 may be provided with reinforcing ribs 25 which may be arranged angularly with respect to the longitudinal axis of the sections as shown in Figure 2. Or, the reinforcing ribs 26 of Figure 5 may be used wherein the ribs 26 have a V-shape. In Figure 6 there is shown a modified arrangement of the ribs which is indicated by the numeral 27 wherein the ribs 27 are arranged parallel with respect to each other and extend parallel to the longitudinal axis of the section. In Figure 7 the ribs are indicated by the numeral 28 and these ribs are arranged at right angles with respect to the longitudinal axis of the section.

The front of the sections 17 and 18 are each provided with a raised offset portion 29 which overlaps the rear end of the next forward or succeeding section. Openings 30 may be provided in the portions 29 for the projection therethrough of the securing elements 23. The front end of the section 16 may be pointed or curved as indicated by the numeral 31.

From the foregoing it is apparent that there have been provided skis for a sled which can be readily attached to the sled or removed therefrom as desired. Thus, when the sled is to be used in freshly fallen snow the skis can be readily attached to the runners 12 by means of the clamps 20. Thus, the wide sections 16, 17 and 18 of the skis will provide increased contact or bearing surface for the sled so that the sled will readily move along shallow or loose snow. Since the skis are made in a plurality of sections 16, 17 and 18 they will be able to move independently as the sled turns or twists so that the skis will not break or become damaged. The curved edges or flanges 19 prevent the sides of the skis from digging into the snow and the heads of the securing elements 23 are secured in countersunk recesses 24 so that these securing elements will not dig into the snow. The ribs 25, 26, 27 and 28 help to reinforce or strengthen the sections of the skis. The fingers 21 conform to the T-shaped runners as shown in Figures 3 and 4. The front section 16 is curved to conform to the curved front portion of the runner 12. By removing the securing elements 22, the sections can be readily clamped to or removed from the runners. The adjacent ends of the sections overlap as shown in Figure 1, so that the ski is in continuous contact with the snow throughout its length. By having the skis made in a plurality of sections, the skis can bend so that the sled can be guided in any desired direction. The parts can be made in any desired size and shape or out of any suitable material. The reinforcing ribs 25, 26, 27 and 28 prevent the ski from accidentally folding up and the skis are preferably shaped and stamped out of sheet metal, although the skis can be made of other suitable material such as wood or the like. If desired a different number of sections can be used on each runner.

It is to be noted that the skis can be easily removed or replaced from the sled. The flanges 19 do not extend along the offset portions 29 of the sections which are at the front of the sections so that the parts can be readily assembled, and the offset portions 29 are raised slightly so as to permit ready attachment of the parts. The clamps 20 may be fastened to the sections with countersunk bolt and nut assemblies, and the clamps 20 can be readily removed or attached in place.

The offset portions 29 are raised and have the same curvature as the main body of the section of the ski. However, the raised offset portions 29 do not have the flanges 19 extending therealong. The skis can flex with the sled due to the plurality of sections. The clamps 20 are arranged as shown in the drawings so that each section of the ski is provided with a plurality of clamps. The offset portions are raised as previously stated.

I claim:

In a sled, a base, a plurality of braces depending from said base, a pair of runners secured to the lower ends of said braces and each including a major straight portion and a front curved portion, each of said runners being of substantial T-shape in cross section, skis detachably connected to said runners and arranged contiguous to the lower surface thereof, said skis including a front curved section arranged contiguous to the front curved portion of the runner, a rear section arranged adjacent the rear of the runner, and an intermediate section extending between said front and rear sections, curved flanges extending upwardly from the side edges of said sections, clamping means detachably connecting said sections to said runners, said clamping means comprising fingers extending upwardly from said sections and secured thereto, said fingers being shaped to include offset shoulders for snugly engaging said T-shaped runners, securing elements interconnecting said fingers together, reinforcing ribs arranged in said sections, the adjacent ends of said sections being arranged in overlapping relation with respect to each other, the front end of said front section being pointed, said sections being wider than said runners.

References Cited in the file of this patent

UNITED STATES PATENTS

| | | |
|---|---|---|
| 954,377 | Bystrom | Apr. 5, 1910 |
| 1,108,160 | Field et al. | Aug. 25, 1914 |
| 2,016,187 | Vincent | Oct. 1, 1935 |
| 2,627,422 | Pagelkopf | Feb. 3, 1953 |